Patented Oct. 31, 1939

2,178,328

UNITED STATES PATENT OFFICE 2,178,328

METHOD OF DEWAXING PETROLEUM OILS

Le Roy G. Story, White Plains, N. Y., assignor to The Texas Company, New York, N. Y., a corporation of Delaware No Drawing. Application January 30, 1937, Serial No. 123,126

6 Claims. (Cl. 196—19)

This invention relates to a method for dewaxing petroleum oils and particularly to a method of separating paraffin wax and like materials from lubricating oil stocks.

This application is a continuation in part of my application Serial No. 655,764, filed February 8, 1933.

It is customary in the refining of wax-containing lubricating oils to remove more or less of the paraffin wax to produce an oil having a suitable pour point. The method of removing the wax varies according to the character of the wax but usually involves filter pressing or separation by methods involving difference in specific gravity, such as cold settling and centrifuging. The waxes in heavier residues and heavier distillates of steam or vacuum distillation are usually amorphous; the waxes from the lighter distillates of steam or vacuum distillation and most distillates and some residues from fire distillation are generally crystalline in character; and the waxes from the intermediate distillates from fire, steam or vacuum distillation are often predominantly amorphous. The crystalline waxes are usually removed from the oils by chilling and filtering and oils containing such waxes are termed "pressable distillates".

The amorphous waxes are difficultly separated by ordinary filtering and other methods, such as cold settling, centrifuging and filter-aid dewaxing, have been devised for separating such waxes from oils. In cold settling or centrifugal operations advantage is taken of the difference in specific gravity of the wax and the oil whereby the amorphous wax being heavier than the oil will separate from a naphtha solution of the latter by gravity or by applying centrifugal force. In the filter-aid dewaxing method a comminuted wax adhering material, such as diatomaceous earth, is mixed with the diluted oil, the mixture chilled and the resulting congealed wax and filter-aid separated by filtering.

I have discovered that if there is added to an oil, which is susceptible to dewaxing by methods involving difference in specific gravity or filter-aid dewaxing, or to an oil which contains crystalline wax in sufficient quantity to prevent or to impair separation by methods involving difference in specific gravity, such as cold settling or centrifuging, substances commonly known as pour point reducing agents or wax crystal inhibitors, the oil is rendered more dewaxable and such methods of dewaxing are substantially improved. I have discovered also that the pour reducing agents may be added to a pressable distillate prior to dewaxing and the resulting mixture dewaxed, at moderately low temperatures, by methods normally producing a pour point of around 20° to 35° F., and the pour point of the resulting product may be in the region of 0° to —20° F. In practicing the invention according to the latter method, it is contemplated that the separation be effected by filtration and the temperatures to which the oil is chilled may be about the same or 10° to 15° lower than the pour point desired of the dewaxed oil. The latter partially dewaxed oil, according to the invention, may be further dewaxed, if desired, by centrifuging or filter-aid dewaxing at much lower temperatures.

The pour point reducing agents or wax crystal inhibitors are certain substances which are added in small amounts to an oil containing wax and of relatively high pour point whereby the pour point is effectively reduced without separating the wax from the oil and without substantially changing the other physical properties of the oil. A number of compounds, artificially prepared and not naturally occurring in the oil, have been discovered and used successfully for this purpose. Such materials comprise certain soaps, such as aluminum and zinc stearates and palmitates, etc., as described in the U. S. patent of myself, Howard B. Beckley, and Harry T. Bennett, No. 1,806,734, May 26, 1931; and U. S. patent of myself and Harry T. Bennett, No. 1,806,735, May 26, 1931. Other saponaceous materials which have since been described as suitable for this purpose are zinc and magnesium soaps of hydroxy stearic acid.

In accordance with my invention the oil to be dewaxed is mixed with the pour point reducing agent before or after dilution with a solvent. In the case of soaps such as aluminum stearate it is often advantageous to heat the oil to a temperature in the region of 180° to 350° F. to incorporate the soap therein and this is preferably done prior to dilution. However, it is often advantageous to produce a gel, for example, consisting of 5 to 10% of the soap in lubricating oil and then disperse the gel in the oil and in the latter instance the gel may be dissolved in the diluted oil. On the other hand when treating a light pressable distillate dilution may be unnecessary. It is general practice, however, especially in the case of heavier products to dilute the oil with 30% to 70% of naphtha, light gasoline, propane, butane or similar solvents, either before or after adding the pour point reducer. The mixture of diluted oil and wax crystal inhibitor is then chilled to a suitable temperature and subjected to a suitable dewaxing operation.

While I have specified a broad temperature range, it is to be understood that the specific temperature which is used will depend on the method of separation of the wax. In general, I prefer to use temperatures around the lower limits for filtration separation and temperatures around the upper limits for separation by centrifuging or equivalent means. For example, in dewaxing by methods involving difference in specific gravity, such as centrifuging, higher temperatures of about 250–350° F. and preferably around 300° F., at which temperature the inhibitor goes entirely into solution, is satisfactory. In filtration dewaxing, it is advantageous that the inhibitor effectively modify the wax which separates over the entire temperature range. This latter effect may be obtained by incorporating the inhibitor into the oil at lower temperatures of about 150–200° F., and preferably about 170° F.–180° F. At these temperatures, a portion of the inhibitor appears to remain in suspended or colloidal form to which is attributed the modifying effect observed on the wax that separates at the higher temperatures. By incorporating the inhibitor at these lower temperatures, an increase in filtering rates as much as four-fold has been observed.

The quantity of pour reducing agent necessary to be added will vary somewhat, depending on the type of oil. In general it may be said that about 0.1% to 1.0% will prove satisfactory and preferably about 0.1% to 0.3% by weight.

The invention will be further understood from the following illustrations of the application thereof:

A pressable distillate having a viscosity of 70–200 seconds at 100° F. and a pour point of 50° to 100° F. may be mixed with about 0.5% of aluminum stearate at a temperature of 180° to 300° F. The mixture is chilled to about 0° F. to +10° F. and filter pressed to remove a portion of the wax. The filtered oil will show a pour point of 0° to −20° F.

The above oil with or without the addition of a further quantity of aluminum stearate may be chilled to about −20° F. and subjected to filter-aid dewaxing; or, instead of filter-aid dewaxing, the oil may be diluted with about 40% of naphtha, chilled to −20° to −40° F. and centrifuged. The finished oil, after removing the diluent, will have a pour test of about −20° F. or below and will be substantially free from wax cloud at moderately low temperatures.

A lubricating oil distillate resulting from the vacuum distillation of a Mid-Continent crude oil and having a viscosity of about 50–100 seconds at 210° F. may be mixed with about 0.25% of aluminum stearate at about 180° F., diluted with about 60% of naphtha, and the mixture chilled to a temperature in the region of −20° F. The resulting chilled mixture and precipitated wax is filtered. The dewaxed oil, after distilling off the naphtha, will show a pour point of about −10° to −20 F.

A long residuum obtained by distilling the naphtha, burning oil and gas oil from a Mid-Continent or Pennsylvania crude may be mixed, preferably after clay decolorizing, with about 0.5% of aluminum stearate at about 350° F. cooled and diluted with 60% of naphtha. The mixture is chilled to a temperature at which the wax is precipitated and then the cool mixture subjected to centrifugal separation. After distilling off the naphtha, an oil having a pour point of about 0° F. or substantially below 0° F. may be obtained.

A cylinder stock produced by distilling off the wax distillate from a Mid-Continent or Pennsylvania crude is heated to about 350° F. with aluminum stearate and formed into a mixture consisting of about 0.1% to 0.3% of aluminum stearate and about 60% of naphtha. The mixture is gradually chilled to about 0° F. while allowing the precipitated wax to cold settle. A clear solution is decanted and the naphtha removed. An oil having a pour point of about 10° F. may be obtained.

The naphtha solution of the foregoing oil, after cold settling and decanting, either with or without the addition of more soap, may be subjected to centrifugal separation at temperatures of −20° to −40° F. and an oil of pour point around 0° to −10° F. may be obtained.

It is understood that the above operations may be modified, for example, filter-aid dewaxing, cold settling, or centrifugal separation are often interchangeable or supplementary one to the other. Also auxiliary treating operations may be used to produce a finished oil. Thus, acid treatment, contact filtration or percolation clay treatment may be applied to the oil, either before or after the dewaxing operation. In some cases it is necessary to remove the hard asphalt present in certain oils prior to dewaxing to obtain satisfactory results.

An advantage of the present invention is that a uniform wax, containing less oil than normally, is obtained and as a result larger yields of dewaxed oil may be recovered. Other advantages are that the filtering rates are usually increased; the time of chilling can be materially reduced; and the amount of refrigeration may be greatly decreased since it is not necessary to chill the oil to as low a temperature to obtain the desired pour point.

I am aware that certain "amorphizing" agents consisting essentially of materials such as amorphous wax and petrolatum, occurring in and recoverable from oils, have been added to lubricating oils containing light crystalline wax whereby the specific gravity of the wax is sufficiently increased to allow separation of the wax from the oil by centrifugal means. The use of such substances apparently is based on the principle of forming solid solutions of crystalline wax and amorphous wax which solutions are of greater average specific gravity than the crystalline wax alone and of sufficient specific gravity to be capable of separation by methods involving difference in specific gravity. No claim is made to methods involving such "amorphizing" agents which are to be distinguished from the herein described pour point reducing agents or wax crystal inhibitors.

Obviously many modifications and variations of the invention, as hereinbefore set forth, may be made without departing from the spirit and scope thereof and therefore only such limitations should be imposed as are indicated in the appended claims.

I claim:

1. A process for dewaxing a wax-bearing oil, which comprises heating the oil in the presence of a soap, which is substantially insoluble in water and effectively modifies wax crystallization, to a temperature of about 180° F., chilling the mixture to precipitate the wax, and filtering the precipitated wax from the oil.

2. A process for dewaxing a wax-bearing oil, which comprises subjecting the oil in the presence of a soap, which is substantially insoluble in water and effectively modifies wax crystallization, to a temperature of about 180° F., chilling the mixture in the presence of a solvent to precipitate the wax, and filtering the precipitated wax from the oil.

3. A process for dewaxing a wax-bearing oil, which comprises subjecting a mixture of the oil, dewaxing solvent and a small proportion of a soap, which has wax crystal modifying properties and is substantially insoluble in water, to a temperature of about 180° F., chilling the mixture to precipitate the wax, and filtering the resultant mixture to separate the wax.

4. A process for dewaxing a wax-bearing oil, which comprises forming a mixture of the oil, dewaxing solvent and a small proportion of aluminum stearate, heating the mixture to about 180° F., chilling the mixture to precipitate the wax, and separating the precipitated wax from the mixture by filtration.

5. A process for dewaxing a wax-bearing oil, which comprises forming a mixture of the oil, naphtha and about 0.1% to 0.3% of aluminum stearate, heating the mixture to about 180° F., chilling the mixture to precipitate the wax, and filtering the preciptated wax from the mixture.

6. A process for dewaxing a wax-bearing oil, which comprises subjecting the oil in the presence of a wax crystal modifying agent comprising a polyvalent metal soap of a higher fatty acid substantially insoluble in water and which effectively modifies wax crystallization to a temperature of about 180° F., chilling the mixture in the presence of a solvent to precipitate the wax, and filtering the precipitated wax from the oil.

LE ROY G. STORY.